US012129695B2

(12) United States Patent
Steinhauser

(10) Patent No.: US 12,129,695 B2
(45) **Date of Patent: *Oct. 29, 2024**

(54) DOOR STOP MECHANISM

(71) Applicants: Connie Rose Hahne, Grand Blanc, MI (US); Paul Steinhauser, Davison, MI (US)

(72) Inventor: Paul Steinhauser, Davison, MI (US)

(73) Assignees: Connie Rose Hahne, Grand Blanc, MI (US); Paul Steinhauser, Davison, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,430

(22) Filed: Jul. 11, 2023

(65) Prior Publication Data

US 2023/0349209 A1 Nov. 2, 2023

Related U.S. Application Data

(63) Continuation of application No. 17/580,086, filed on Jan. 20, 2022, now Pat. No. 11,702,872.

(60) Provisional application No. 63/139,506, filed on Jan. 20, 2021.

(51) Int. Cl.
*E05F 5/02* (2006.01)
*E05C 17/00* (2006.01)

(52) U.S. Cl.
CPC .................................. *E05C 17/025* (2013.01)

(58) Field of Classification Search
CPC .......... E05C 17/00; E05C 17/46; E05C 17/54; E05C 17/44; E05C 17/025; E05F 5/02; E05F 5/04; E05F 5/06; E05F 5/00; E05F 2005/046; E05Y 2900/132;
(Continued)

(56) References Cited

U.S. PATENT DOCUMENTS

| | | | | |
|---|---|---|---|---|
| 1,258,856 A * | 3/1918 | Beaudette | ................. | E05F 5/04 16/83 |
| 1,260,192 A | 3/1918 | Hall | | |
| 1,522,998 A | 1/1925 | Buerger | | |

(Continued)

FOREIGN PATENT DOCUMENTS

| | | |
|---|---|---|
| GB | 2213519 A | 8/1989 |
| GB | 2459084 A | 10/2009 |
| JP | 3140207 A | 3/2008 |

OTHER PUBLICATIONS

Adjustable Hinge Mounted Pin Door Bumper / Door Stop available at https://www.build.com/product/summary/548306?uid=578208, last accessed Jan. 20, 2022.

(Continued)

*Primary Examiner* — Chuck Y Mah

(74) *Attorney, Agent, or Firm* — The Dobrusin Law Firm, P.C.; Daniela M. Thompson-Walters

(57) ABSTRACT

A door stop mechanism having a) a bracket housing configured to be mounted to a frame; and b) a swivel stop rotationally affixed to the bracket housing and able to rotate between a retracted position and an extended position; wherein in the extended position, the swivel stop is configured to be partially wedged between the frame and a door stile to maintain a door in an open position; and wherein in the retracted position, the swivel stop is configured to retract into the bracket housing and allow the door to be in a closed position.

20 Claims, 9 Drawing Sheets

(58) Field of Classification Search
CPC ......... E05Y 2201/212; E05Y 2201/224; Y10T 292/71; Y10T 292/73
See application file for complete search history.

(56) References Cited

U.S. PATENT DOCUMENTS

| | | | | | |
|---|---|---|---|---|---|
| 1,555,625 | A | | 9/1925 | Beisler | |
| 2,464,637 | A | | 3/1949 | Grant | |
| 2,722,443 | A | * | 11/1955 | Falk | E05F 5/027 292/99 |
| 2,820,981 | A | | 1/1958 | Klee | |
| 2,890,475 | A | * | 6/1959 | Carlson | E05F 5/02 16/82 |
| 2,965,918 | A | | 12/1960 | Leanza | |
| 3,105,992 | A | * | 10/1963 | Carlson | E05B 65/102 49/141 |
| 3,172,168 | A | | 3/1965 | Suska | |
| 3,341,240 | A | | 9/1967 | Hazard | |
| 3,765,126 | A | | 10/1973 | Pappas | |
| 3,862,774 | A | | 1/1975 | Johnson | |
| 4,110,867 | A | | 9/1978 | Gwozdz | |
| 4,261,140 | A | * | 4/1981 | McLean | E06B 7/36 16/83 |
| 4,648,152 | A | | 3/1987 | Grewall | |
| 4,765,662 | A | * | 8/1988 | Suska | E05B 65/06 292/254 |
| 4,838,589 | A | | 6/1989 | DiAmico | |
| 5,450,652 | A | | 9/1995 | Webb | |
| 5,509,235 | A | | 4/1996 | Chander | |
| 6,244,636 | B1 | | 6/2001 | Rissone | |
| 6,510,587 | B2 | | 1/2003 | Urschel | |
| 6,550,186 | B2 | | 4/2003 | Haq | |
| 6,874,198 | B2 | | 4/2005 | Renaud | |
| 6,904,643 | B2 | | 6/2005 | Duffy | |
| 8,060,982 | B2 | | 11/2011 | Magoz | |
| 8,276,240 | B2 | * | 10/2012 | Ritachka | E05F 5/06 16/83 |
| D682,081 | S | | 5/2013 | Crawford | |
| 8,595,899 | B2 | * | 12/2013 | McRoskey | E05F 5/04 16/83 |
| 9,009,917 | B2 | | 4/2015 | Chao | |
| 9,273,505 | B1 | | 3/2016 | Knittel | |
| 9,903,144 | B2 | | 2/2018 | Gibson | |
| 10,508,482 | B1 | * | 12/2019 | Schaefer | E05C 17/443 |
| 2008/0222847 | A1 | | 9/2008 | Mayer | |
| 2010/0242226 | A1 | | 9/2010 | Hopkins et al. | |
| 2012/0079680 | A1 | | 4/2012 | McRoskey | |
| 2013/0340204 | A1 | | 12/2013 | Callahan | |
| 2021/0115715 | A1 | * | 4/2021 | Kaspersen | E05D 3/02 |
| 2022/0136309 | A1 | | 5/2022 | Cappelli | |

OTHER PUBLICATIONS

Door Wedge from Pressto Valet available at https://www.zoro.com/pressto/valet-door-wedge-reinforced-thermo-plastic-red-2h-x-2-12w-pvds-02/i/G9102773/, last accessed Jan. 20, 2022.

Hanging Doorstop available at https://www.etsy.com/listing/826810367/hanging-doorstop-prop-doors-open-easily, last accessed Jan. 20, 2022.

Standard Duty White Pneumatic Door Closer from Wright Products available at https://www.homedepot.com/p/Wright-Products-Standard-Duty-White-Pneumatic-Door-Closer-V1020WH/202065852#product-overview, last accessed Jan. 20, 2022.

Storm Door Hold Open Washer available at https://www.swisco.com/hold-open-washer/pd/Other-Replacement-Storm-Door-Hardware/40-045, last accessed Jan. 20, 2022.

* cited by examiner

DOOR STOP MECHANISM

CROSS REFERENCE TO RELATED APPLICATIONS

This application claims priority benefit to U.S. Provisional Application No. 63/139,506, filed on Jan. 20, 2021, the contents of which are incorporated herein by reference in their entirety.

FIELD

The present teachings relate to a door stop mechanism. The door stop mechanism may find particular use in temporarily maintaining a storm door in an open position.

BACKGROUND

Exterior doors, such as storm doors, commonly use cylinder-based closers. These closers are typically hydraulic or pneumatic. These cylinders may provide for a delayed action and prevent slamming when the door is closing. Some of these cylinders also come with locking brackets which, when engaged, maintain the cylinder in a propped open position, thus retaining the door in an open position.

Cylinder door closers are known to be problematic overtime. The cylinders themselves may wear out, thus rendering the locking brackets ineffective. Additionally, the cylinders tend to be mounted to either the bottom or the top of the doors and frames. This makes the locking bracket difficult to reach, such as by petite adults, children, elderly individuals, and individuals with disabilities.

Some individuals may use temporary wedges or chocks to prop a storm door open. These require moving and removing a component. Sometimes the wedge becomes a trip hazard if a floor-based wedge. Additionally, the wedge or chock may have to be removed from the door's closing pathway to allow the door to close and then be provided with a storage area in a residence or building that is in proximity to the door.

What is needed is a door stop mechanism which is easily accessible but yet out of the way. What is needed is a door stop mechanism which can be permanently or semi-permanently mounted to a door frame while allowing a door to open and close. What is needed is a door stop mechanism which can be temporarily placed into a position to prop a door in an open position. What is needed is a door stop mechanism which can be retracted and allow a door to close.

SUMMARY

The present teachings relate to a door stop mechanism comprising: a) a bracket housing configured to be mounted to a frame; and b) a swivel stop rotationally affixed to the bracket housing and able to rotate between a retracted position and an extended position; wherein in the extended position, the swivel stop is configured to be partially wedged between the frame and a door stile to maintain a door in an open position; and wherein in the retracted position, the swivel stop is configured to retract into the bracket housing and allow the door to be in a closed position.

The present teachings relate to an entry comprising: a) a frame of an entry opening having a jamb; b) an exterior door hingedly affixed to the jamb; c) a door frame having a jamb channel, wherein the door frame is affixed to an exterior of the frame; d) a storm door having a hinge stile, wherein the hinge stile is hingedly affixed to the jamb channel; e) a door stop mechanism affixed to the jamb, between the exterior door and the door frame, wherein the door stop mechanism includes: i) a bracket housing mounted to the jamb of the frame; and ii) a swivel stop rotationally affixed to the bracket housing and able to rotate between a retracted position and an extended position; wherein in the extended position, the swivel stop is configured to be partially wedged between the frame and the hinge stile to maintain a door in an open position; and wherein in the retracted position, the swivel stop is configured to retract into the bracket housing and allow the door to be in a closed position.

The present teachings further relate to a method of temporarily propping the door in the open position using the door stop mechanism according to the teachings herein. The method may include: i) moving the swivel stop from the retracted position to the extended position by rotating about a rotational axis and removing from a swivel gap of the bracket housing; ii) placing the swivel stop within a jamb channel of a door frame; and iii) placing the swivel stop in contact with a hinge stile of the door such that the hinge stile is in contact with a fulcrum of the swivel stop and biases the swivel stop toward the jamb channel.

The present teachings provide a door stop mechanism which may be mounted to a frame of an entry, providing for accessibility. The door stop mechanism may have a retracted position and an extended position. In an extended position, the door stop mechanism may maintain the door in an open position. In a retracted position, the door stop mechanism may allow the door to close. The door stop mechanism may be particularly suitable for use with a storm door. The door stop mechanism may be mounted on a jamb between a storm door and an entry door.

DETAILED DESCRIPTION

Figure 1A:
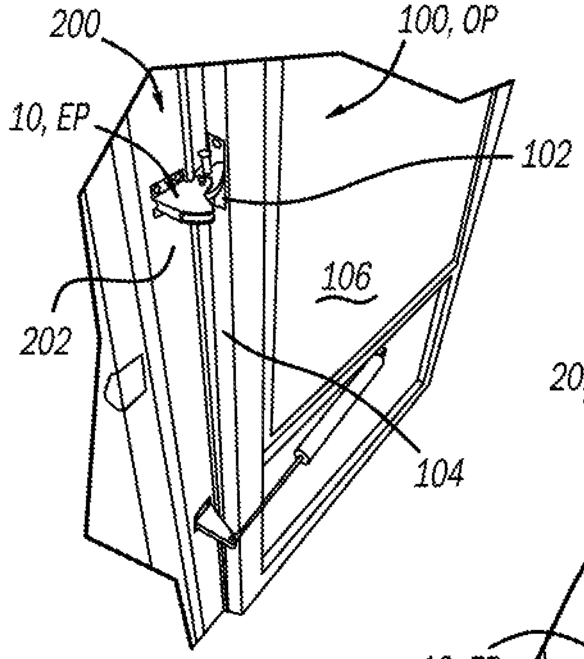
FIG. 1A illustrates a door stop mechanism in an extended position holding a door in an open position.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a door stop mechanism. The door stop mechanism may function to maintain a door in an open position, be easily withdrawn such as to allow a door to close off an entry opening in a closed position, provide a wedge for wedging the door into an open position, provide for an easily accessible door wedge that is at an easy reaching height, the like, or any combination thereof. The door stop mechanism may include a bracket housing and swivel stop. The swivel stop may rotate about a rotational axis from a retracted position to an extended position and vice-versa. The swivel stop may form a wedge which prevents a door from closing. The door stop mechanism may be compatible with left-swinging doors, right-swinging doors, or both.

The door stop mechanism may cooperate with one or more doors which close off an entry opening. One or more doors may be one or more hinged doors. One or more doors may include a primary door, secondary door, or both. One or more doors may include one or more exterior doors, interior doors, storm doors, the like, or any combination thereof. A primary door may be considered the exterior door. A secondary door may be considered a storm door. One or more doors may cover an entry opening. The entry opening may be formed by a frame. The frame may include a jamb. The jamb may be hingedly affixed to one or more doors, such as an exterior door. The primary door may be right-swinging, left-swinging, or both. The frame may have a secondary frame affixed thereto. A secondary frame may be referred to as a door frame. A secondary frame may refer to the frame of a storm door assembly. A secondary frame may have a jamb channel. A jamb channel may be an L-shaped, I-shaped, C-shaped, planar, the like, or a combination thereof. A jamb channel may have a first portion substantially perpendicular to a second portion. A jamb channel may be hingedly affixed to a door. The jamb channel may be hingedly affixed to a secondary door. The secondary door may be a storm door. The secondary door may be right-swinging, left-swinging, or both. The secondary frame may be distanced from an exterior door by the jamb. The door stop mechanism may be affixed to the jamb.

The door stop mechanism includes a bracket housing. The bracket housing functions to mount the door stop mechanism to a stationary surface adjacent to a door. The bracket housing may function to mount the door stop mechanism to a jamb of a frame, such as between an exterior door and a storm door. The bracket housing may also function house one or more swivel stops. The bracket housing may include a housing portion, mounting portion, or both. The bracket housing may include one or more walls, bridges, openings, locating surfaces, pivot stop surfaces, mounting portions, the like, or any combination thereof. The bracket housing may be formed of multiple pieces or a unitary piece. For example, the bracket housing may be formed from a metal sheet. The bracket housing may be symmetrical about a plane, asymmetrical, or both. The bracket housing may be, at least partially, symmetrical about a plane extending parallel through a swivel gap. Symmetry may allow for the bracket housing to be mounted on a jamb of a left-swinging door, right-swinging door, or both.

The bracket housing may include a mounting portion. A mounting portion may function to affix the door stop mechanism to a support surface. A mounting portion may include one or more flanges. One or more flanges may project from one or more walls. One or more flanges may be at an angle to one or more walls. One or more flanges may be substantially perpendicular to one or more walls. One or more flanges may project away from a swivel gap. One or more flanges may include two flanges. A first flange may project perpendicular from an upper wall. A second flange may project perpendicular from a lower wall. The first flange and second flange may project in opposing directions. The mounting portion may abut with, rest flush on, or both one or more support surfaces. For example, the first and second flange may rest substantially flush on a jamb of a frame. The first and second flange may have a length substantially parallel with a longitudinal axis for the door stop mechanism. A longitudinal axis may extend in a direction from an exterior door to an opposing storm door when both are in a closed position, parallel to a surface of a jamb, or both. The mounting portion may include one or more through holes. The first and second flange may have a length less than or equal to a width of a jamb. Having a length greater than a width of a jamb might prevent the exterior or storm doors from fully closing. The first and second flange may have a length of about 0.5 inches or greater, about 0.75 inches or greater, or even about 1 inch or greater. The first and second flange may have a length of about 8 inches or less, about 6 inches or less, about 4 inches or less, about 2.5 inches or less, or even about 2 inches or less. The first and second flange may have a height. The height may be measured as the distance from where the flange meets the wall of a bracketing housing to the peripheral edge of the flange. The first and second flange may have a sufficient height to accommodate one or more through holes, provide a surface for one or more heads of one or more fasteners to apply pressure, or both. The first and second flange may have a height which is about 0.25 inches or greater, about 0.3 inches or greater, or even about 0.4 inches or greater. The first and second flange may have a height which is about 2 inches or less, about 1 inch or less, or even about 0.6 inches or less. For example, the height may be about 0.5 inches. The flanges may have a thickness. The thickness may be a thickness suitable for one or more walls and/or bridges of the housing portion. The thickness may be about the same as the one or more walls and/or bridges as the mounting portion may be integral with the same.

The bracket housing may include one or more through holes. The one or more through holes may function to allow one or more mechanical fasteners therethrough to secure the bracket housing to a support surface. The one or more through holes may be formed through the mounting portion. One or more through holes may be formed in one or more flanges. One or more through holes may include two or more through holes in each flange. For example, a first flange may have two through holes and a second flange may have two through holes. The through holes of one flange may be symmetrical to through holes of a second flange. Symmetry may be about a swivel gap. The one or more through holes may be sized such as to allow one or more mechanical fasteners to pass therethrough. The one or more through holes may be sized to allow standard screw diameters to fit therethrough. The one or more through holes may have a diameter of about 0.06 inches or greater or greater, about 0.08 inches or greater, or even about 0.13 inches or greater. The one or more through holes may have a diameter of about 0.25 inches or less, about 0.19 inches or less, or even about 0.16 inches or less. The one or more mechanical fasteners may include one or more threaded fasteners, non-threaded fasteners, and the like. For example, a screw may pass through each through hole and anchor into the support surface. As an alternative to through holes and fasteners, or in combination with, the mounting portion could be affixed to a support surface via one or more adhesives.

The bracket housing may include a housing portion. The housing portion may function to house a swivel stop, provide for a static body about which a swivel stop can rotate, or both. The housing portion may include one or more walls, bridges, openings, locating surfaces, pivot stop surfaces, a swivel gap, the like, or a combination thereof. The housing portion may include one or more walls. One or more walls may include an upper wall, lower wall, or both. The one or more walls may be distanced from and opposing one another. The one or more walls may be symmetrical about the swivel gap. The distance between two opposing walls may be the swivel gap. The swivel gap may function to at least partially house a swivel stop therein. The two opposing walls may be affixed to one another by a bridge. The bridge may extend from the upper wall to the lower wall. The bridge may span a distance of the swivel gap, may partially cover the swivel gap, or both. The bridge may be located adjacent to, opposite from, or therebetween, the mounting portion. The bridge may be integral with the opposing walls. The bridge may only span partially or completely across one side of the housing portion, such that the remainder are free of a bridge and completely expose a swivel gap. The walls, bridge, or both may have a thickness. The thickness may be considered a distance from a surface facing inward toward the swivel gap to an exterior surface facing away from the swivel gap. The thickness may be suitable for allowing the bracket housing to provide sufficient structure and rigidity to the door stop mechanism. The thickness may be about 0.04 inches or greater, about 0.06 inches or greater, or even about 0.08 inches or greater. The thickness may be about 0.25 inches or less, about 0.21 inches or less, or even about 0.16 inches or less. For example, a thickness may be about 0.12 inches (e.g., about ⅛ inch).

Opposite the bridge there may be one or more locating surfaces. One or more locating surfaces may function to aid in placement of the bracketing housing on one or more support surfaces. One or more locating surfaces may be one or more peripheral surfaces of a wall, such as both an upper wall and lower wall. One or more locating surfaces may extend beyond one or more mounting portions. One or more locating surfaces may extend forward beyond a length of one or more flanges. One or more locating surfaces may extend forward beyond a length of one or more flanges by about 0.05 inches or greater, about 0.1 inches or greater, or even about 0.2 inches or greater beyond a length of one or more flanges. One or more locating surfaces may extend forward beyond a length of one or more flanges by about 2 inches or less, about 1 inch or less, or even about 0.5 inches or less. For example, a locating surface may extend about 0.25 inches beyond a length of one or more flanges. When mounted to a supporting surface, a locating surface may be aft of, aligned with, forward of, and/or overlapping an edge of the supporting surface, a portion of a locating surface may include the furthest surface of a wall opposite from a bridge. A locating surface may have a profile which is arcuate, linear, or both. The profile may refer to a two-dimensional shape from a top view of the door stop mechanism. The locating surface may extend toward a pivot stop surface. The locating surface may be at least partially arcuate with a radius extending from one or more openings.

The housing portion may include one or more openings. The one or more openings may function to receive one or more rotation aids therethrough. The one or more openings may receive one or more shafts, pins, and/or the like. The one or more openings may have a diameter smaller than, equal to, or greater than a diameter of one or more rotation aids. The one or more openings may have a diameter of about 0.05 inches or greater, about 0.08 inches or greater, or even about 0.12 inches or greater. The one or more openings may have a diameter of about 0.5 inches or less, about 0.4 inches or less, or even about 0.25 inches or less. The one or more openings may of a housing portion may be referred to as one or more pivot openings. The one or more pivot openings may be concentric with one or more other pivot openings, rotation aids, a rotational axis, the like, or a combination thereof.

The housing portion may include one or more pivot stop surfaces. The one or more pivot stop surfaces may function to cooperate with one or more pivot stops, locate a swivel stop into a retracted position, prevent a swivel stop entering too far into the swivel gap and thus being difficult to access by a user, the like, or any combination thereof. The one or more pivot stop surfaces may be one or more peripheral surfaces of a lower wall, upper wall, or both. The one or more pivot stop surfaces may be located opposite a mounting portion, one or more flanges, or both. The one or more pivot stops may be located generally between a locating surface and bridge, a pivot opening and bridge, or both. The one or more pivot stops may be formed at one or more contour changes of a peripheral surface of the upper wall, lower wall, or both.

The door stop mechanism may include one or more pivot pins. The one or more pivot pins may function to create a rotational axis about which a swivel stop rotates, affix the swivel stop to the bracket housing, or both. The one or more pivot pins may extend through one or more pivot openings of the bracket housing, swivel stop, or both. The one or more pivot pins may include one or more shafts, heads, locks, the like, or any combination thereof. A shaft may be the portion of the pivot pin which extends through the one or more pin openings, is concentric with the one or more pin openings, is parallel with a rotational axis, provides the rotational surface, the like, or any combination thereof. At one or both ends of the shaft may be a head, lock, or both. The head, lock, or both may maintain the pivot pin within the pivot openings, sandwich the bracket housing, or both. The one or more pivot pins may have a diameter such that a swivel stop is able to rotate about it or rotate with the pivot pin.

The door stop mechanism includes a swivel stop. The swivel stop functions to wedge a door in an open position, allow for a door to move into a closed position, or both. The swivel stop is rotationally affixed to the bracket housing. The swivel stop is partially located between an upper wall and lower wall. The swivel stop is partially located within a swivel gap. The swivel stop may include a swivel body, leg portion, wedge portion, chock surface, fulcrum, pivot stop, the like, or any combination thereof. The swivel stop may be comprised of a unitary body. The unitary body may be referred to as a swivel body. The swivel stop may be symmetrical about a plane, asymmetrical, or both. The swivel stop may be, at least partially, symmetrical about a plane extending parallel through a swivel gap, parallel to interior surfaces of the upper wall and/or lower wall, or a combination thereof. Symmetry may allow for the swivel stop to cooperate with a left-swinging door, right-swinging door, or both.

The swivel body may include a leg portion continuous with a wedge portion. A leg portion may function to remain at least partially within the swivel gap, affix the swivel stop to the pivot pin, or both. A leg portion may include one or more pivot openings. The pivot opening may be concentric with one or more pivot openings of a bracket housing. The leg portion may have a thickness thinner than a thickness than a wedge portion. The leg portion may be adjacent to the wedge portion.

The wedge portion may function to provide a wedge between a frame and a door. The wedge portion may prevent a door from closing, hold a door into an open position, or both. The wedge portion may at least partially reside within a swivel gap, housing portion, or both when the swivel stop is in a retracted position. The wedge portion may be completely outside of the swivel gap, housing portion, or both when the swivel stop is in the extended position. The wedge portion is configured to come into contact with a door, door frame, or both. The wedge portion may include a peripheral surface configured to contact a hinge stile of a door. The wedge portion may have a length. The length may be adapted to fit within a jamb channel. The length may be measured from the chock surface, fulcrum, or both to an opposing surface of the wedge portion, where the wedge meets the leg portion, or both. The length of the wedge portion may be about less than, equal to, or even greater than a thickness of a jamb channel. The length of the wedge portion may be about 0.5 inches or greater, about 0.75 inches or greater, or even about 1 inch or greater. The length of the wedge portion may be about 2 inches or less, about 1.75 inches or less, or even about 1.5 inches or less.

The swivel stop includes a chock surface. The chock surface is configured to contact the door, provide a fulcrum, or both. The chock surface may come into contact with a hinge stile of a door when the swivel stop is in an extended position. Contact may mean in direct contact with the stile surface itself, direct contact with a plate (e.g., strike plate) located on the stile, or the like. The chock surface may be linear, arcuate, or both. The chock surface may include an apex. The chock surface may include a fulcrum. Contact of the stile with the chock surface, such as at the fulcrum, may bias the swivel stop. Bias may be toward a jamb channel. Bias may include into or further into the extended position. By the stile applying a biasing force onto the chock surface, the wedge portion is biased (e.g., wedged) against the jamb channel which provides a counter force against the door stile. This counter force maintains the door propped in the open position. To alleviate the counter force, the door must be slightly further opened, and then the wedge portion may be removed from a wedge gap by rotating into the retracted position.

The swivel stop may include a pivot stop. The pivot stop may function to locate the swivel stop in a retracted position, allow for easy accessibility of the swivel stop to move from the retracted position to the extended position and vice-versa. The pivot stop may cooperate with a pivot stop surface of the bracket housing. When the pivot stop abuts with a pivot stop surface, the swivel stop may be in the retracted position. The pivot stop may be located such that it is accessible. The pivot stop may be located on a wedge portion. The pivot stop may be configured to rotate about a rotational axis, pivot pin, or both. The pivot stop may be used by an individual to cause rotation of the swivel stop about the rotational axis, pivot pin, or both. The pivot stop may include one or more projections extending from a swivel body. The pivot stop may project relatively perpendicular to the swivel body. The pivot stop may project upward, such as toward an upper wall, downward, such as to a lower wall, or any combination thereof. The pivot stop may project in opposing directions to provide for a universal use door stop mechanism (e.g., left or right hinged door). The one or more projections may be affixed to, integral with, or both the swivel body. The one or more projections may be a type of shaft affixed to the swivel body. The pivot stop may have a height sufficient to come into contact with the pivot stop surface, allow for an individual to use for causing rotation of the swivel stop, or both. The pivot stop may have a height equal to or greater than a thickness of a wall of the bracket housing. The pivot stop may have a height of about 0.2 inches or greater, about 0.5 inches or greater, or even about 0.75 inches or greater. The pivot stop may have a height of about 3 inches or less, about 2 inches or less, or even about 1.5 inches or less.

The door stop mechanism may be configured to move between an extended position and retracted position, and vice-versa. A retracted position may allow the door stop mechanism to be out of the way and allow a door to close an entry opening, such as in a closed position. An extended position may allow for the door stop mechanism to prevent a door from closing, bias the door toward an open position, or both. In the extended position, a swivel stop may be at least partially located within a wedge gap, adjacent to a jamb channel, within a jamb channel, in contact with a hinge stile, in contact within a jamb channel, a swivel gap, within a bracket housing, the like, or any combination thereof. In a retracted position, a swivel stop may be partially located within a swivel gap, adjacent to a jamb, within a bracket housing, between a primary door (e.g., exterior door) and a secondary door (e.g., storm door), the like, or a combination thereof. To move between a retracted position and extended position, one or more portions of the door stop mechanism may rotate. A swivel stop may rotate about a rotational axis, pivot pin, or both. Rotation may be caused by force applied by an individual. Force may be applied onto a pivot stop, the swivel body, or both.

The door mechanism may be comprised of one or more materials. The one or more materials may function to provide the door stop with sufficient strength to bias a door into an open position, to withstand temperatures at an exterior of an entry, to withstand exposure to sunlight at an exterior of an entry, or a combination thereof. The one or more materials may include one or more metals, polymeric materials, the like, or a combination thereof. One or more metals may include steel, aluminum, brass, carbon steel, rolled steel, galvanized metals, stainless steel, copper, the like, or any combination thereof. One or more polymeric materials may be one or more thermoplastics, thermosets, or both. One or more polymeric materials may include carbon-based materials (e.g., graphite), polyurethane (PUR), polystyrene (PS), polyvinyl chloride (PVC), polyethylene (PE), silicone, acrylonitrile butadiene styrene (ABS), polypropylene, polybutylene terephthalate, the like, or a combination thereof. The one or more materials may include one or more reinforcement materials. Exemplary forms of a reinforcing material include particles, beads, porous material, fibrous material, fabric, woven material, non-woven material, the like, or any combination thereof. For example, one or more materials may include carbon fiber. Different portions of the door stop mechanism may be comprised of the same material compositions or different material compositions. For example, the bracket housing may be one or more metals while the swivel stop is one or more polymeric materials. The one or more materials may be formed into the bracket housing, swivel stop, or both via roll forming, extrusion, press braking, stamping, forging, casting, plastic injection molding, reaction injection molding, vacuum casting, the like, or any combination thereof.

Illustrative Embodiments

Figure 1B:
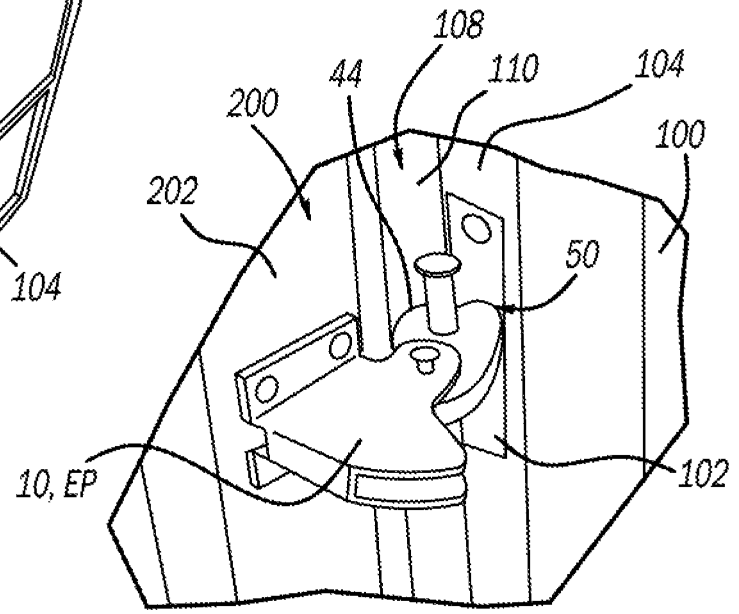
FIG. 1B illustrates a door stop mechanism in an extended position holding a door in an open position.

FIGS. 1A and 1B illustrate a door stop mechanism 10 in an extended position EP. In the extended position EP, the door stop mechanism 10 holds a door 100 in an open position OP. The door 100 includes a plate 102. The plate 102 is located on a stile 104 of the door 100. The stile 104 may be referred to as the hinge stile. The stile 104 is substantially perpendicular to a panel 106 of the door 100. The door stop mechanism 10 is affixed to an entry frame 200 of an entry opening 300. The frame 200 includes a jamb 202. The jamb 202 may be referred to as the hinge jamb. In the open position OP, the stile 104 is offset from parallel with the jamb 202. The stile 104 may be substantially perpendicular or even at an obtuse angle relative to the jamb 202. In the open position OP, a portion of the door stop mechanism is located within a door frame 108. The door frame 108 may be affixed to and separate from the frame 200. The door frame 108 includes a jamb channel 110. A wedge portion 44 of the door stop mechanism 10 resides within the jamb channel 110 to maintain the door 100 in the open position OP.

Figure 2A:
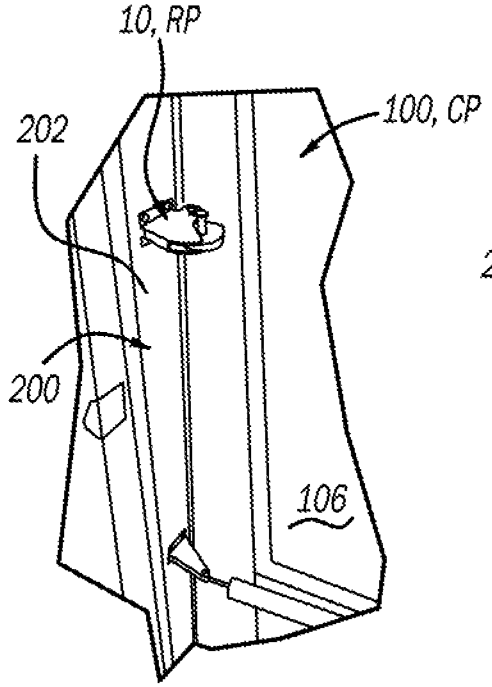
FIG. 2A illustrates a door stop mechanism in a retracted position with a door in a closed position.
Figure 2B:
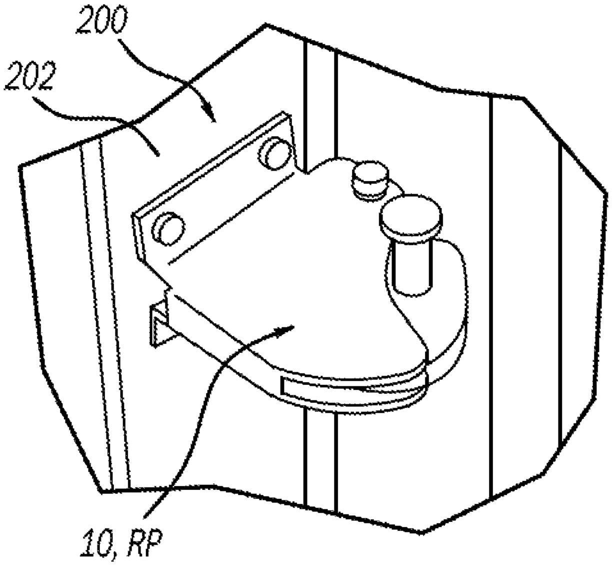
FIG. 2B illustrates a door stop mechanism in a retracted position with a door in a closed position.

FIGS. 2A and 2B illustrate a door stop mechanism 10 in a retracted position RP. In the retracted position RP, the door stop mechanism 10 allows the door 100 to move into a closed position CP. In the closed position OP, the stile 104 (such as shown in FIGS. 1A-1B) is substantially parallel with the jamb 202. In the closed position CP, the panel 106 of the door 100 closes off the entry opening 300.

Figure 3:
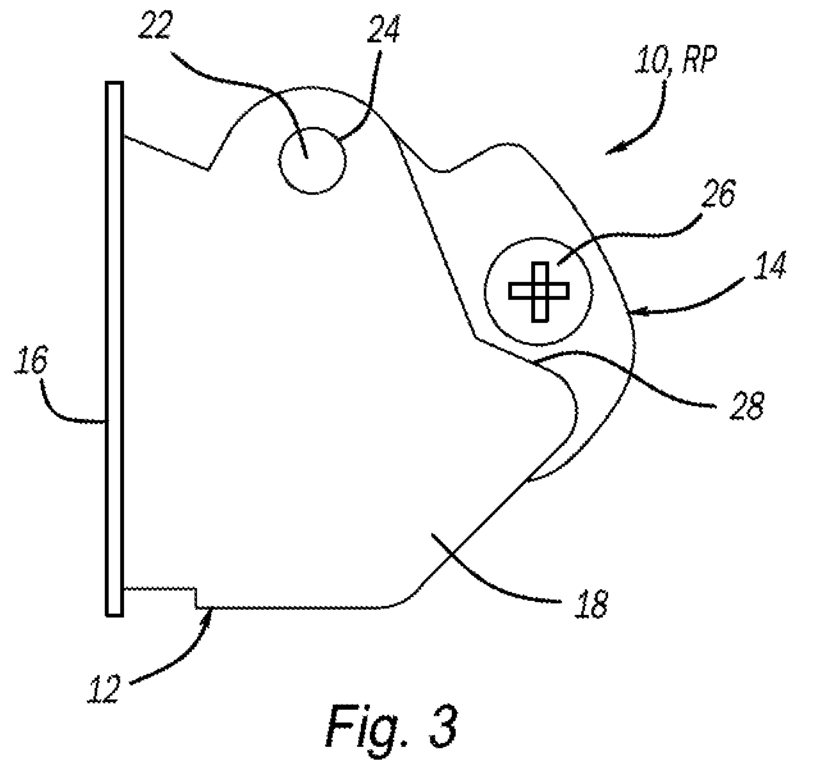
FIG. 3 is a top view of a door stop mechanism in a retracted position.
Figure 4:
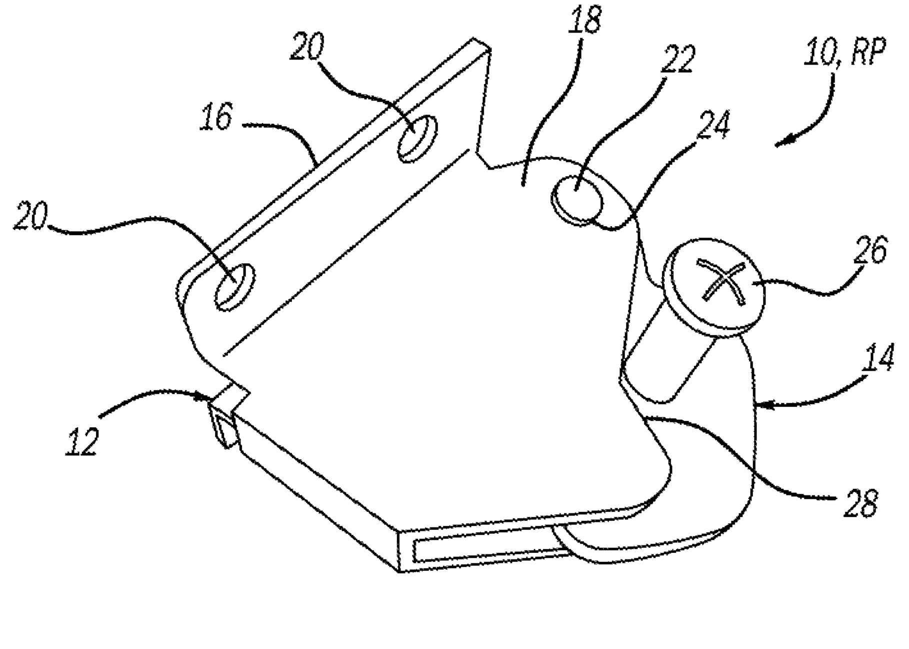
FIG. 4 is a perspective view of a door stop mechanism in a retracted position
Figure 5:
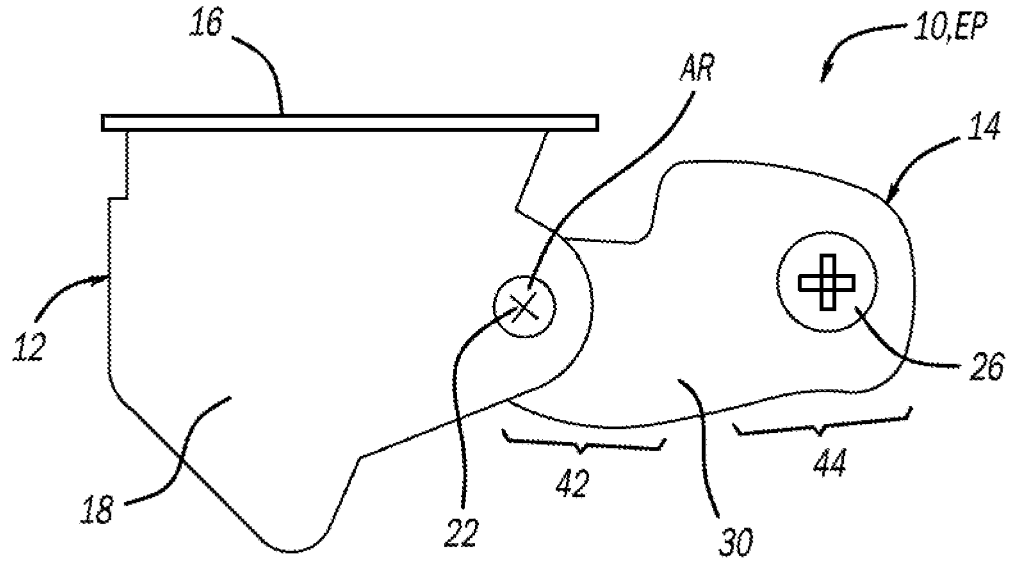
FIG. 5 is a top view of a door stop mechanism in an extended position.
Figure 6:
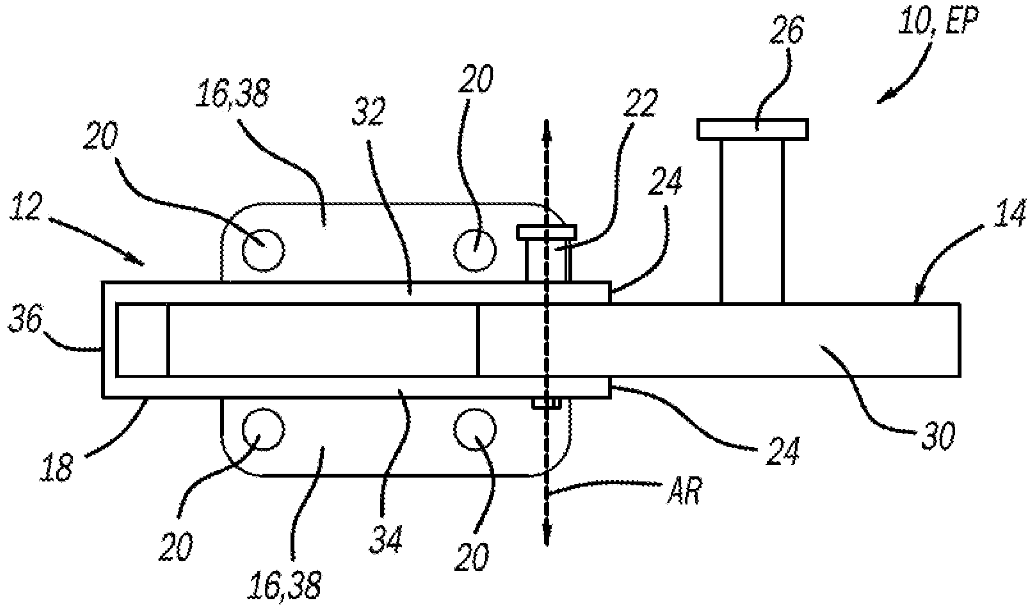
FIG. 6 is a side view of a door stop mechanism in an extended position.
Figure 7:
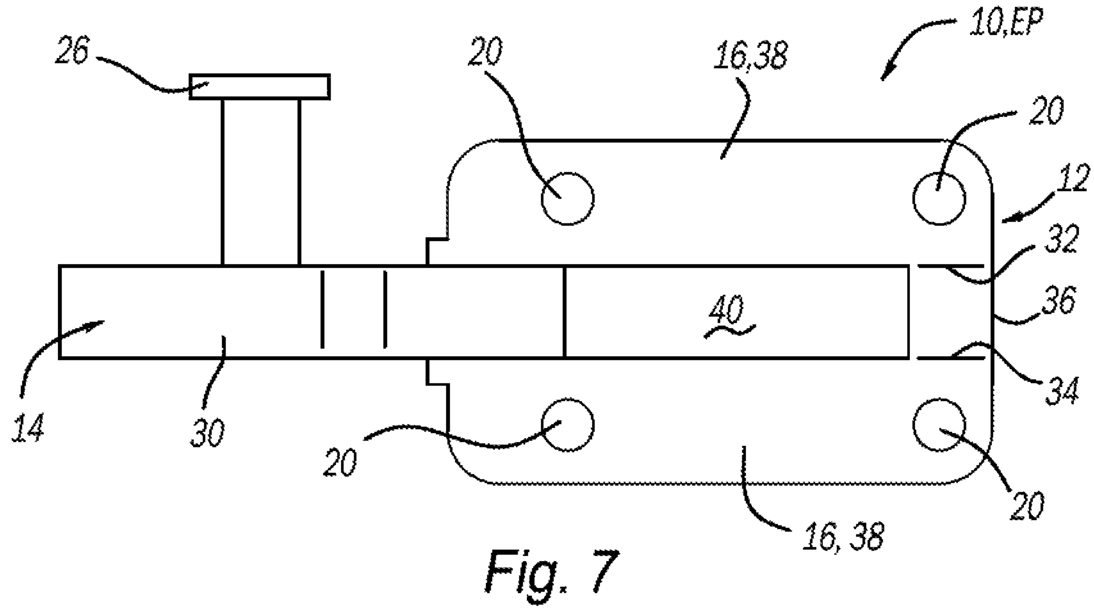
FIG. 7 is a side view of a door stop mechanism in an extended position.
Figure 8:
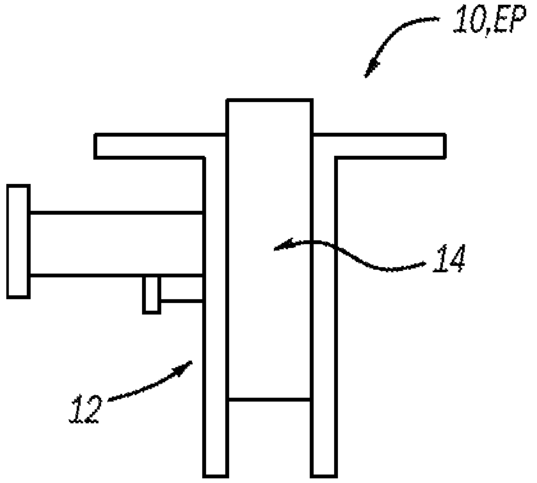
FIG. 8 is a front view of a door stop mechanism in an extended position.
Figure 9:
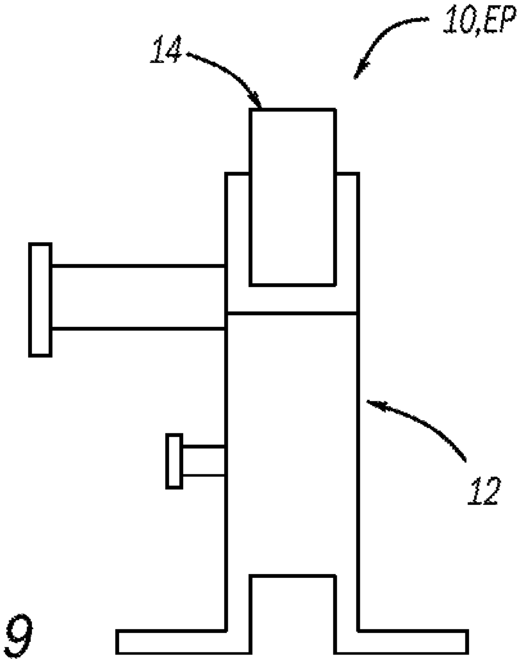
FIG. 9 is a rear view of a door stop mechanism in an extended position.

FIGS. 3 and 4 illustrate a door stop mechanism 10 in a retracted position RP. The door stop mechanism 10 includes a bracket housing 12 and a swivel stop 14. The bracket housing 12 includes a mounting portion 16 and a housing portion 18. The mounting portion 16 includes a plurality of through holes 20. The door stop mechanism 10 includes a pivot pin 22. The pivot pin 22 extends through pivot openings 24 of the bracket housing 12 and swivel stop 14. The swivel stop 14 rotates about the pivot pin 22 from the retracted position RP to the extended position EP and vice-versa. The swivel stop 14 includes a pivot stop 26. The pivot stop 26 prevents the swivel stop 14 from being fully located within the bracket housing 12. The pivot stop 26 abuts with a pivot stop surface 28 of the bracket housing 14.

FIGS. 5 to 9 illustrate a door stop mechanism 10 in an extended position EP. The swivel stop 14 is rotated out of the bracket housing 12. The swivel stop 14 rotates about a rotational axis AR. The rotational axis AR extends through the pivot pin 22. The pivot pin 22 extends through the bracket housing 12 and swivel stop 14. The swivel stop 14 includes a swivel body 30. The swivel body 30 includes a leg portion 42 and a wedge portion 44. Projecting from the swivel body is a pivot stop 26. The bracket housing 12 includes a housing portion 18. The housing portion 18 is substantially symmetrical. The housing portion 18 includes an upper wall 32 connected to an opposing lower wall 34 via a bridge 36. The upper wall 32 is distanced from the lower wall 34 such as to create a swivel gap 40. The upper wall 32 and lower wall 34 each include a pivot opening 24 through which the pivot pin 22 passes. The mounting portion 16 includes mounting flanges 38. The mounting flanges 38 project from the upper and lower walls 32, 34.

Figure 10:
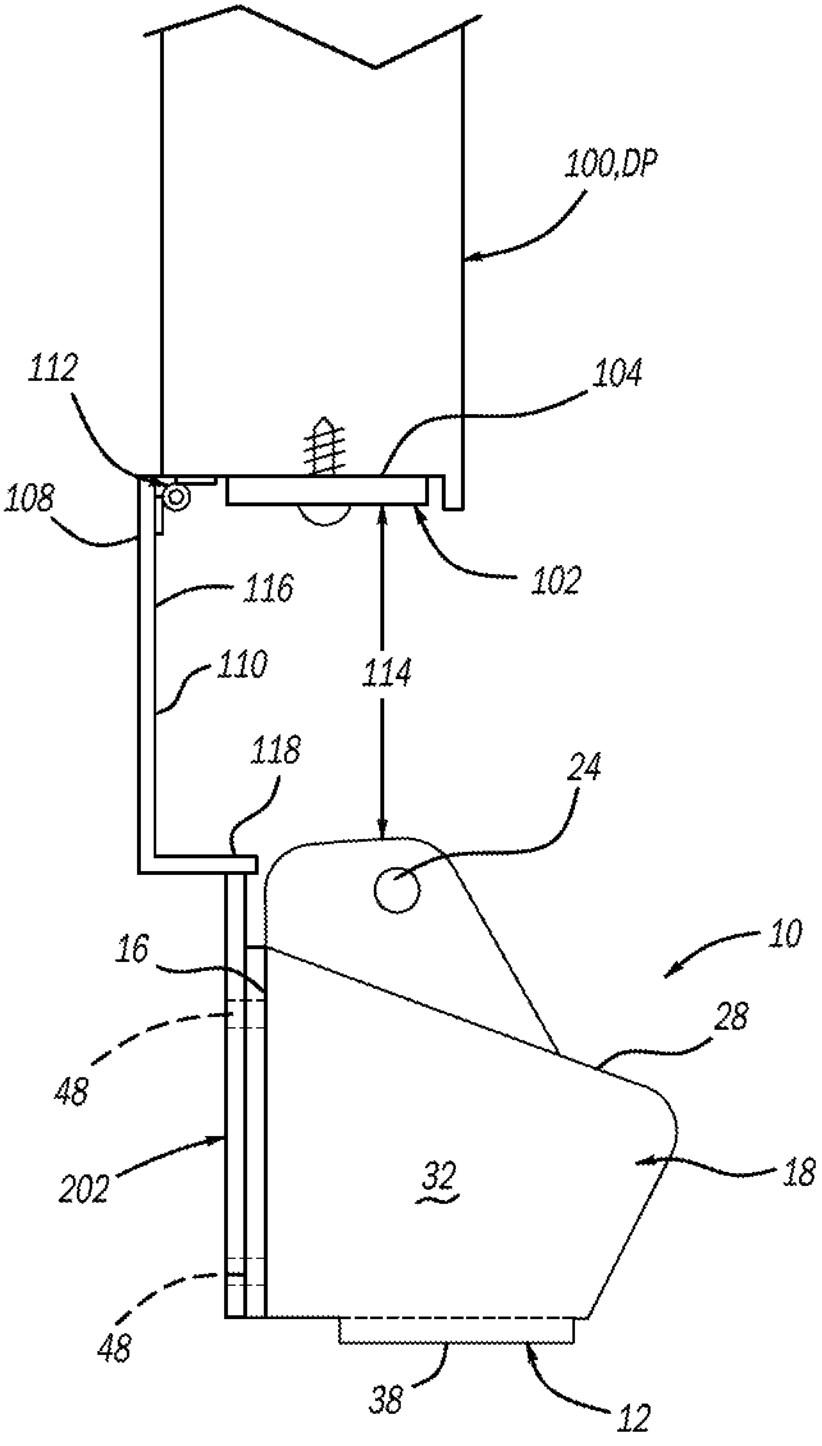
FIG. 10 is a top view of a bracket housing affixed to a frame.

FIG. 10 illustrates a bracket housing 12 affixed to a jamb 202. The bracket housing 12 includes a mounting portion 16. The mounting portion 16 is affixed to a jamb 202 via fasteners 46. The bracket housing 12 includes a housing portion 18. The housing portion 18 includes an upper wall 32 and bridge 38. Opposite the bridge 38 is a pivot opening 24. Between the bridge 38 and the pivot opening 24 is a pivot stop 28. Adjacent to the jamb 202 is a door frame 108. The door frame 108 includes a jamb channel 110. The jamb channel 110 includes a first leg 116 perpendicular to a second leg 118. Affixed to the door frame 108 via a hinge 112 is a door 100. The door 100 includes a stile 104. Located on the stile 104 is a plate 102. When the door 100 is in the open position OP, the jamb channel 100 is exposed. A wedge gap 114 is created between the stile 104 and the bracket housing 12.

Figure 11:
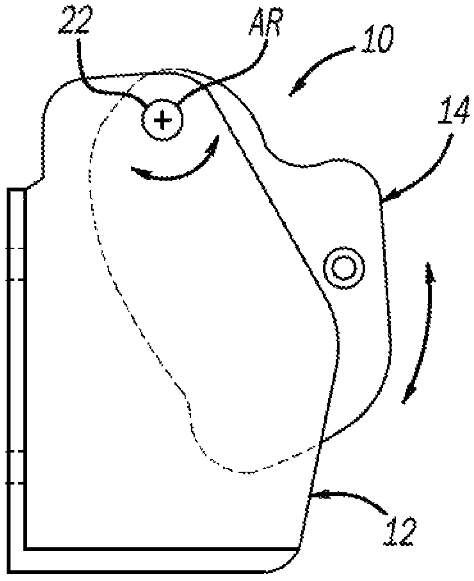
FIG. 11 is a top view of a door stop mechanism with a swivel stop between the retracted position and the extended position.

FIG. 11 illustrates rotation of a swivel stop 14 relative to a bracket housing 12. The swivel stop 14 rotates about a rotational axis AR. The rotational axis AR is formed by a pivot pin 22.

Figure 12:
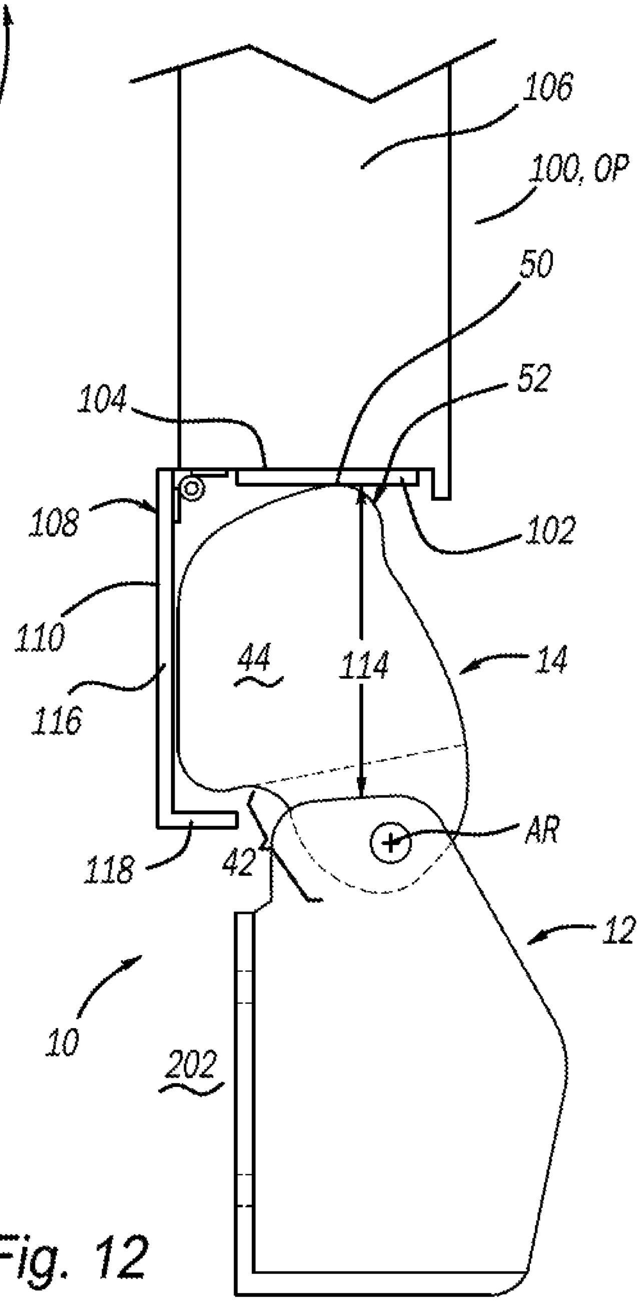
FIG. 12 is a top view of a door stop mechanism in an extended position propping a door in an open position.
Figure 13:
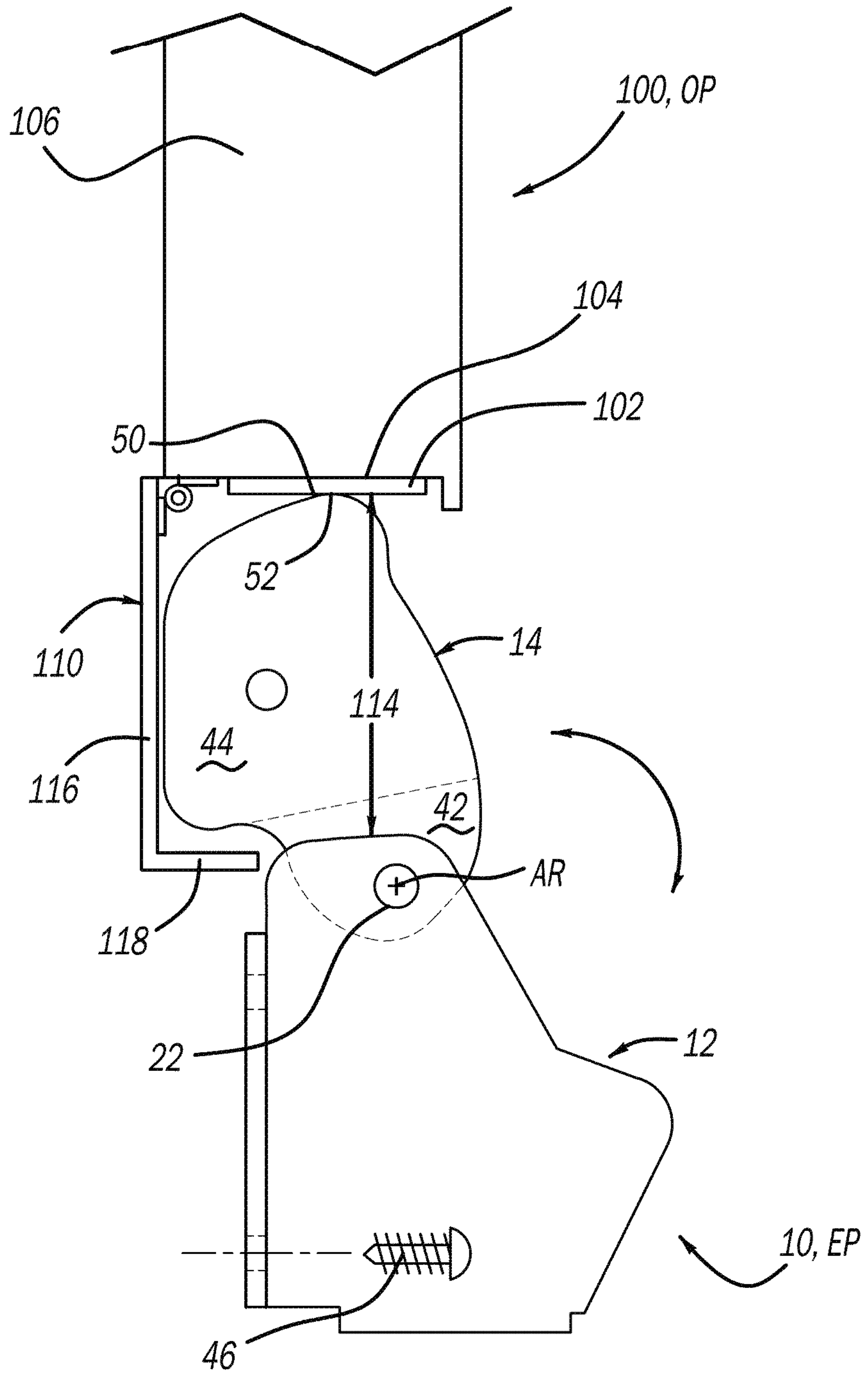
FIG. 13 is a top view of a door stop mechanism in an extended position propping a door in an open position.

FIGS. 12-13 illustrate a door stop mechanism 10 in an extended position EP and holding a door 100 in an open position OP. The swivel stop 14 is rotated out of the bracket housing 12. The swivel stop 14 includes a leg portion 42 and a wedge portion 44. The wedge portion 44 is wedged within a wedge gap 114. The wedge portion 44 abuts with the door 100. The wedge portion 44 abuts with a stile 104. To avoid damage to the stile 104, a plate 102 is located thereon. The wedge portion 44 is in contact with the plate 102. The wedge portion 104 has a length which is about the same as the length of the first leg 116 of the jamb channel 110.

Figure 14:
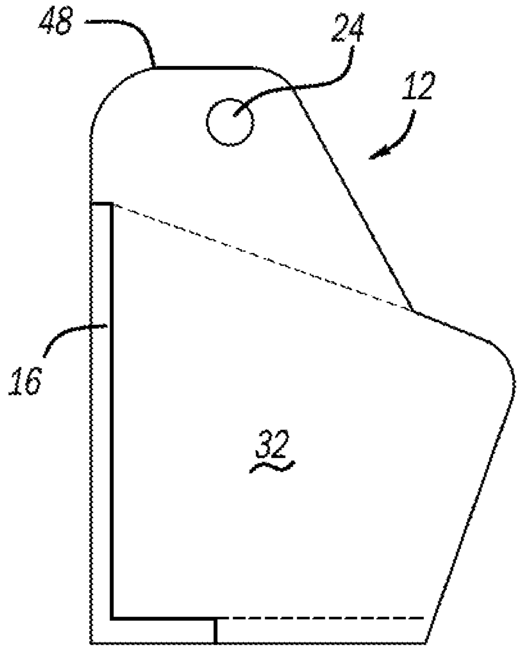
FIG. 14 is a top view of a bracket housing.
Figure 15:
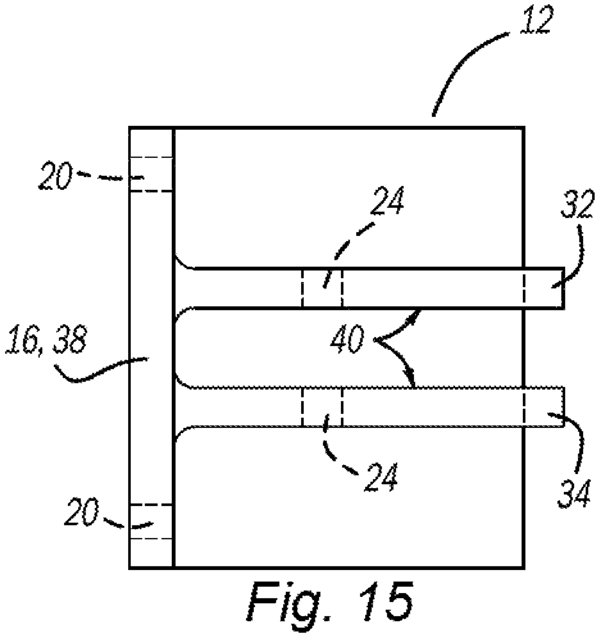
FIG. 15 is a front view of a bracketing housing.
Figure 16:
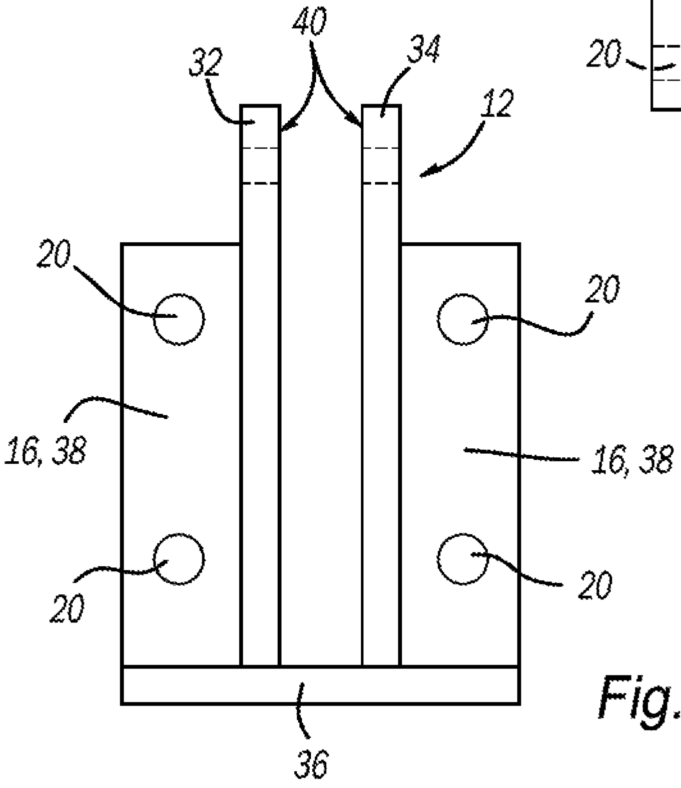
FIG. 16 is a side view of a bracket housing

FIGS. 14-16 illustrate a bracket housing 12. The bracket housing includes an upper wall 32 opposing a lower wall 34. The upper wall 32 is connected to the lower wall 34 via a bridge 36. The upper wall 32 and lower wall 34 include a pivot opening 24. The pivot opening 24 is located opposite the bridge 36. Opposite the bridge 36 is also the locating surface 48. The upper wall 32 is distanced from the lower wall 34 to provide for a swivel gap 40. Projecting from each of the upper wall 32 and lower wall 34 is a mounting flange 38.

Figure 17:
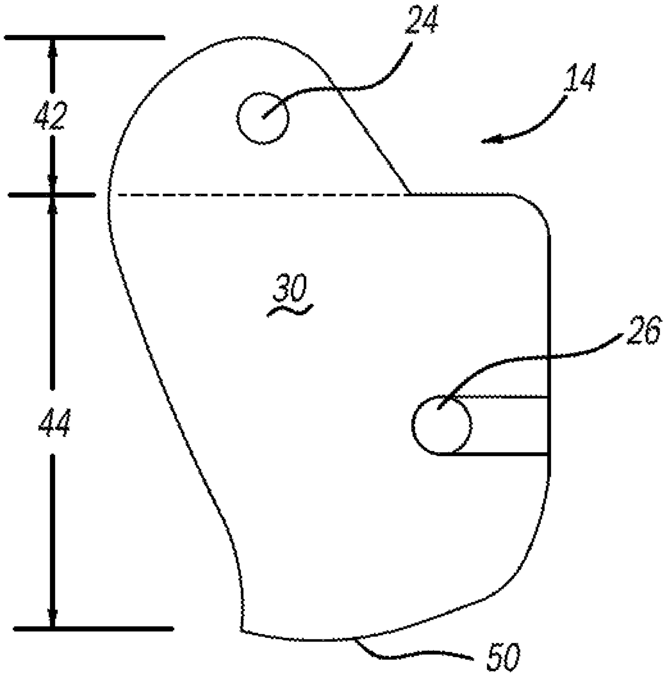
FIG. 17 is a top view of a swivel stop.
Figure 18:
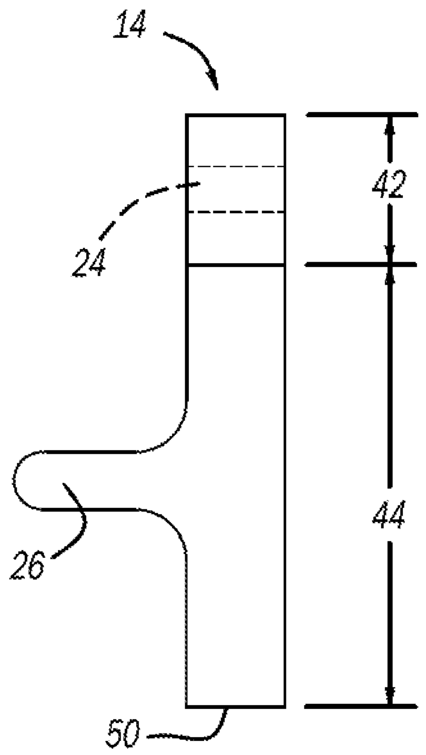
FIG. 18 is a side view of a swivel stop.
Figure 19:
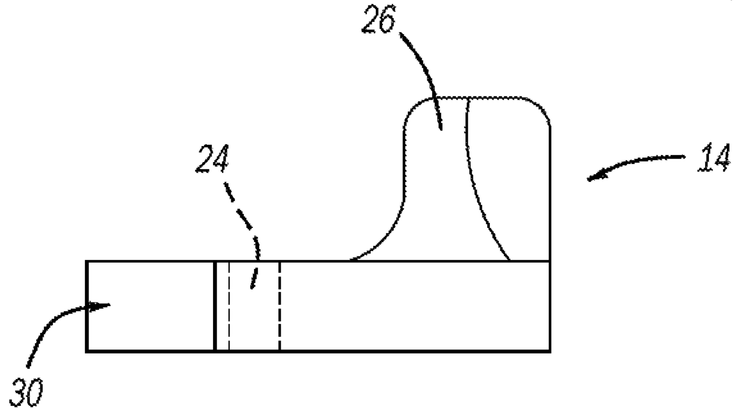
FIG. 19 is a front view of a swivel stop.

FIGS. 17-19 illustrate a swivel stop 14. The swivel stop 14 includes a swivel body 30. The swivel body 30 includes a leg portion 42 and a wedge portion 44. A pivot opening 24 extends through the leg portion 42. Opposite the pivot opening 24 is a chock surface 50. The chock surface 50 may function to contact the door 100, such as a stile 104 or plate 102. Extending from the wedge portion 44 is a pivot stop 26.

REFERENCE NUMBER LISTING

10 Door stop mechanism
12 Bracket Housing
14 Swivel stop
16 Mounting portion
18 Housing portion
20 Through hole
22 Pivot pin
24 Pivot opening
26 Pivot stop
28 Pivot stop surface
30 Swivel body
32 Upper Wall
34 Lower Wall
36 Bridge
38 Mounting flanges
40 Swivel gap
42 Leg portion
44 Wedge portion
46 Fastener
48 Locating surface
50 Chock surface
52 Fulcrum
100 Door
102 Plate
104 Stile
106 Panel
108 Door frame
110 Jamb channel
112 Hinge
114 Wedge gap
116 First leg
118 Second leg
200 Entry frame
202 Jamb
300 Entry opening
AR Rotational Axis
CP Closed position
EP Extended position
OP Open position
RP Retracted position Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A door stop mechanism comprising:

a) a bracket housing configured to be mounted to a frame of an entry opening, the bracket housing including:
  i) a swivel gap formed in the bracket housing;
  ii) a bridge connecting opposing walls and forming a distance for the swivel gap;
  iii) one or more mounting flanges;

b) a pivot pin through at least a portion of the bracket housing and located opposite the bridge; and c) a swivel stop rotationally affixed to the bracket housing via the pivot pin and able to rotate about the pivot pin between a retracted position and an extended position, wherein the swivel stop includes:
  i) a chock surface which is configured to contact a door stile of a door when the swivel stop is in the extended position;
  wherein in the retracted position, the swivel stop is configured to at least partially retract into the swivel gap of the bracket housing such that the chock surface is adjacent to the bridge and allow the door to be in a closed position;
  wherein in the extended position, the swivel stop is rotated about the pivot pin such that the chock surface moves from being adjacent to the bridge to being generally opposite of the bridge; and
  wherein in the extended position, the swivel stop is configured to be partially wedged between the frame and the door stile of the door to maintain the door in an open position.

2. The door stop mechanism of claim 1, wherein the opposing walls include an upper wall opposing a lower wall and connected via the bridge.

3. The door stop mechanism of claim 2, wherein the one or more mounting flanges project from the upper wall, the lower wall, or both.

4. The door stop mechanism of claim 3, wherein the one or more mounting flanges are configured to be mounted to the frame of the entry opening by one or more mechanical fasteners.

5. The door stop mechanism of claim 1, wherein the swivel stop includes a wedge portion that when in the extended position is located outside of the bracket housing and when in the retracted position is located at least partially within the swivel gap.

6. The door stop mechanism of claim 5, wherein the wedge portion has a length about the same as a width of a door frame.

7. The door stop mechanism of claim 5, wherein the wedge portion includes the chock surface which is configured to be in contact with the door stile of the door.

8. The door stop mechanism of claim 1, wherein the chock surface includes a fulcrum.

9. The door stop mechanism of claim 1, wherein contact of the door stile with the chock surface biases the swivel stop toward a jamb channel and into the extended position and thus maintains the door propped in the open position.

10. The door stop mechanism of claim 1, wherein the bracket housing includes one or more pivot stop surfaces formed at one or more peripheral surfaces; and wherein the one or more pivot stop surfaces is configured to come into contact with one or more pivot stops of the swivel stop and prevent the swivel stop from being fully retracted into the swivel gap when rotated into the retracted position.

11. The door stop mechanism of claim 10, wherein the one or more pivot stops projects from a body of the swivel stop.

12. The door stop mechanism of claim 11, wherein the one or more pivot stops is located between the chock surface of the swivel stop and a rotational axis of the swivel stop.

13. The door stop mechanism of claim 1, wherein the bracket housing includes a two-dimensional profile shape which includes a locating surface which is opposite the bridge and angles toward one or more pivot stop surfaces also part of the bracket housing; and wherein the locating surface is configured to be located adjacent to, aligned with, aft of, in front of, or a combination thereof a jamb channel of the frame.

14. The door stop mechanism of claim 1, wherein the swivel stop has a two-dimensional profile shape which is thinner in thickness closer to a rotational axis and thicker at a wedge portion of the swivel stop.

15. The door stop mechanism of claim 1, wherein the door is a storm door.

16. The door stop mechanism of claim 1, wherein the door stop mechanism is configured for universal mounting.

17. A door assembly comprising:

a) a frame of an entry opening having a jamb;

b) an exterior door hingedly affixed to the jamb;

c) a door frame having a jamb channel, wherein the door frame is affixed to an exterior of the frame;

b) a storm door having a hinge stile, wherein the hinge stile is hingedly affixed to the jamb channel;

c) a door stop mechanism affixed to the jamb, between the exterior door and the door frame, wherein the door stop mechanism includes:

i) a bracket housing mounted to the jamb of the frame, the bracket housing including a swivel gap formed in the bracket housing;

a bridge connecting opposing walls and forming a distance for the swivel gap;

one or more flanges;

ii) a pivot pin through at least a portion of the bracket housing and located opposite the bridge;

ii) a swivel stop rotationally affixed to the bracket housing via the pivot pin and able to rotate about the pivot pin between a retracted position and an extended position, wherein the swivel stop includes:

a chock surface which is configured to contact the hinge stile of the storm door when the swivel stop is in the extended position;

wherein in the retracted position, the swivel stop is configured to at least partially retract into the swivel gap of the bracket housing such that the chock surface is adjacent to the bridge and allow the storm door to be in a closed position;

wherein in the extended position, the swivel stop is rotated about the pivot pin such that the chock surface moves from being adjacent to the bridge to being generally opposite of the bridge; and wherein in the extended position, the swivel stop is configured to be partially wedged between the door frame and the hinge stile to maintain the storm door in an open position.

18. The door assembly of claim 17, wherein contact of the hinge stile with the chock surface biases the swivel stop toward the jamb channel and into the extended position and thus maintains the storm door propped in the open position.

19. The door assembly of claim 17, wherein the bracket housing includes a two-dimensional profile shape which includes a locating surface which is opposite the bridge and angles toward one or more pivot stop surfaces also part of the bracket housing; and wherein the locating surface is configured to be located adjacent to, aligned with, aft of, in front of, or a combination thereof the jamb channel of the door frame.

20. A method of temporarily propping the door in the open position using the door stop mechanism according to claim 1, wherein the method includes:

i) moving the swivel stop from the retracted position to the extended position by rotating about a rotational axis and moving out of the swivel gap of the bracket housing;

ii) placing the swivel stop within a jamb channel of a door frame; and iii) placing the swivel stop in contact with a hinge stile of the door such that the hinge stile is in contact with a fulcrum of the swivel stop and biases the swivel stop toward the jamb channel.

* * * * *